United States Patent
Haapea et al.

(10) Patent No.: US 9,635,153 B2
(45) Date of Patent: Apr. 25, 2017

(54) TEST ADAPTER

(71) Applicant: PKC Electronics Oy, Raahe (FI)

(72) Inventors: Vesa Haapea, Raahe (FI); Jukka Ahola, Raahe (FI)

(73) Assignee: PKC ELECTRONICS OY, Raahe (FI)

( * ) Notice: Subject to any disclaimer, the term of this patent is extended or adjusted under 35 U.S.C. 154(b) by 318 days.

(21) Appl. No.: 14/250,666

(22) Filed: Apr. 11, 2014

(65) Prior Publication Data

US 2014/0312187 A1    Oct. 23, 2014

(30) Foreign Application Priority Data

Apr. 19, 2013   (FI) .................................... 20135397

(51) Int. Cl.
| | |
|---|---|
| *B23Q 3/00* | (2006.01) |
| *H04M 1/24* | (2006.01) |
| *F16B 2/10* | (2006.01) |
| *H04M 1/04* | (2006.01) |

(52) U.S. Cl.
CPC ............... *H04M 1/24* (2013.01); *F16B 2/10* (2013.01); *H04M 1/04* (2013.01)

(58) Field of Classification Search
CPC .. F16B 2/10; H04M 1/04; H04M 1/24; G01R 31/28
USPC ............. 248/157, 161, 162.1, 163.2, 295.11, 248/309.4, 313, 346.06, 918; 269/91, 95, 269/309
See application file for complete search history.

(56) References Cited

U.S. PATENT DOCUMENTS

| | | | | |
|---|---|---|---|---|
| 5,107,599 | A * | 4/1992 | Marincic ............. | G01B 5/0004 269/309 |
| 5,167,405 | A * | 12/1992 | Cayley, Jr. .......... | B23Q 1/0063 248/346.06 |
| 5,628,484 | A * | 5/1997 | Lechuga ................ | E03C 1/326 248/149 |
| 7,918,427 | B2 * | 4/2011 | Wang .................... | F16M 13/00 248/278.1 |

(Continued)

FOREIGN PATENT DOCUMENTS

| | | |
|---|---|---|
| CN | 202083749 U | 12/2011 |
| CN | 202444534 U | 9/2012 |

(Continued)

OTHER PUBLICATIONS

European Search Report, Application No. EP 14 16 4417, dated Jul. 25, 2014.

(Continued)

*Primary Examiner* — Gwendolyn Baxter
(74) *Attorney, Agent, or Firm* — Hoffmann & Baron, LLP

(57) ABSTRACT

A test adapter for an electronic product to be tested includes a support structure and a product stand supported on the support structure for the product. The product stand is supported to the support structure by a guide structure that controls the vertical movement of the product stand. The product stand is arranged with a direct or indirect pressing movement from above to be movable from a top position to its low position supported by the guide structure. The test adapter includes a retaining structure for retaining the product stand in the low position and for retaining a latch structure of the adapter in its locking position. The latch structure is arranged to lock the product to the product stand.

16 Claims, 10 Drawing Sheets

(56) References Cited

U.S. PATENT DOCUMENTS

| | | |
|---|---|---|
| 7,984,886 B2 * | 7/2011 | Lin .................... B60R 11/0252 108/44 |
| 2004/0007651 A1 * | 1/2004 | Williams ............... F16M 11/04 248/346.06 |
| 2005/0151551 A1 | 7/2005 | Okuda et al. |
| 2007/0057681 A1 | 3/2007 | Chang |
| 2007/0159197 A1 | 7/2007 | Brueckner et al. |
| 2009/0045819 A1 | 2/2009 | Lin |
| 2009/0278297 A1 | 11/2009 | Wang |
| 2010/0216328 A1 | 8/2010 | Chen |
| 2012/0112780 A1 | 5/2012 | Groeger |
| 2012/0312950 A1 * | 12/2012 | Sears ................... F16M 11/041 248/316.5 |

FOREIGN PATENT DOCUMENTS

| | | |
|---|---|---|
| DE | 10 2006 036031 A1 | 2/2008 |
| DE | 10 2007 037944 A1 | 2/2009 |
| JP | 2004152554 A | 5/2004 |

OTHER PUBLICATIONS

Pekka Alitalo, Finnish Search Report for corresponding Finnish Application No. 20135397, pp. 1-2, Jan. 23, 2014.

\* cited by examiner

TEST ADAPTER

CROSS-REFERENCE TO RELATED APPLICATION

This application claims priority to Finnish Patent Application No. 20135397, filed Apr. 19, 2013, which is incorporated by reference herein in its entirety.

BACKGROUND

Field

The invention relates to a test adapter for an electronic product to be tested, the test adapter comprising a support structure and a product stand supported on the support structure for the product.

Description of the Related Art

Test adapters are used in electronics industry during the product development phase or production phase to test the operation of the designed prototype or finished product. The product being tested, i.e. DUT (Device under test) may for instance be a terminal for a radio network, such as a mobile phone used in a cellular radio network. A test adapter is a platform belonging or attachable to a testing station, through which the product being tested can be connected to the systems of the testing station for the purpose of testing the operation of a transceiver or user interface, for example.

The basic structure of an adapter comprises a product stand supported by a base, i.e. in practice on the base, on which the product, such as mobile phone, is placed. The product stand may be made of plastic and in its basic shape it may be a lowsided rectangular tray, for example, in which the shape of the tray is to some extent in the shape of the bottom of the product being tested. The product stand may be exchangeable for each product.

Known adapter models use one or more small electric motors and/or pneumatic cylinders, which move locking brackets in relation to the product stand and the product on it, to lock the product in place on the product stand. An electric connection to the product is also achieved in the known solutions by using one or more small electric motors and/or pneumatic cylinders in such a manner that the electric motors/pneumatic cylinders move connectors and/or contact pins supported to the support structure into contact with counter-pieces, such as I/O ports or other connectors, on the product. Electric motors/pneumatic cylinders are in contact with the bottom surface of the support structure made of aluminium, for example, and by means of a lifting or lateral movement, they move one or more locking members into their locking position and a contact pin or a corresponding connector into contact with the counter-pieces on the product. In a known adapter, there are three small electric motors under the support structure. In a traditional adapter model, it is possible to form, by means of holes penetrating through an aluminium support frame, for instance, an electric connection from the testing system through the support frame to the tested product located on the product stand which is on the support frame. The connection may naturally be a two-way connection, so that the testing system can both supply an excitation signal and measure the response of the tested product.

However, there are problems related to the known solutions, especially to the need of several electric motors and/or pneumatic cylinders and to the costs they cause in the manufacture of adapters. The locking of the product onto the product stand is a specific problem.

Thus, there is a need to develop a novel test adapter that is capable of reducing the number of problems in known solutions.

SUMMARY

It is an object of the invention to provide an improved test adapter. This is achieved by the test adapter of the invention that is characterised in that the product stand is supported to the support structure by a guide structure controlling the vertical up-and-down movement of the product stand and that the product stand is, by a direct or indirect pressing movement from the top, arranged to be movable from a top position to a low position on the guide structure and that the test adapter comprises a retaining structure for retaining the product stand in the low position and for retaining a latch structure in the adapter in a locking position, the latch structure being arranged to lock the product to the product stand.

Preferred embodiments of the invention are disclosed in the dependent claims. The preferred embodiments enhance the advantages of the basic invention.

The solution of the invention provides several advantages, especially in avoiding the use of possibly expensive electric motors/pneumatic cylinders or at least in significantly diminishing the need for them. The invention provides a cost-effective locking structure for the product. The invention may also make it possible to utilise manual operation to press down the product and its product stand, because the worker doing manual work is usually the one who places the product on the product stand of the test adapter, so it is easy for the same worker during the next step to press the product with its product stand into the low position, in which the latch locks into its locking position, and in an embodiment the connectors or other contact structures in the test adapter can come into contact with the product.

BRIEF DESCRIPTION OF THE DRAWINGS

The invention will now be described in greater detail in connection with preferred embodiments and with reference to the accompanying drawings, in which.

DETAILED DESCRIPTION

This is a test adapter TA for an electronic product to be tested, and the product is marked DUT (Device Under Test). DUT may be a radio network terminal, such as a mobile phone used in a cellular network, without being limited thereto, however.

Figure 1:
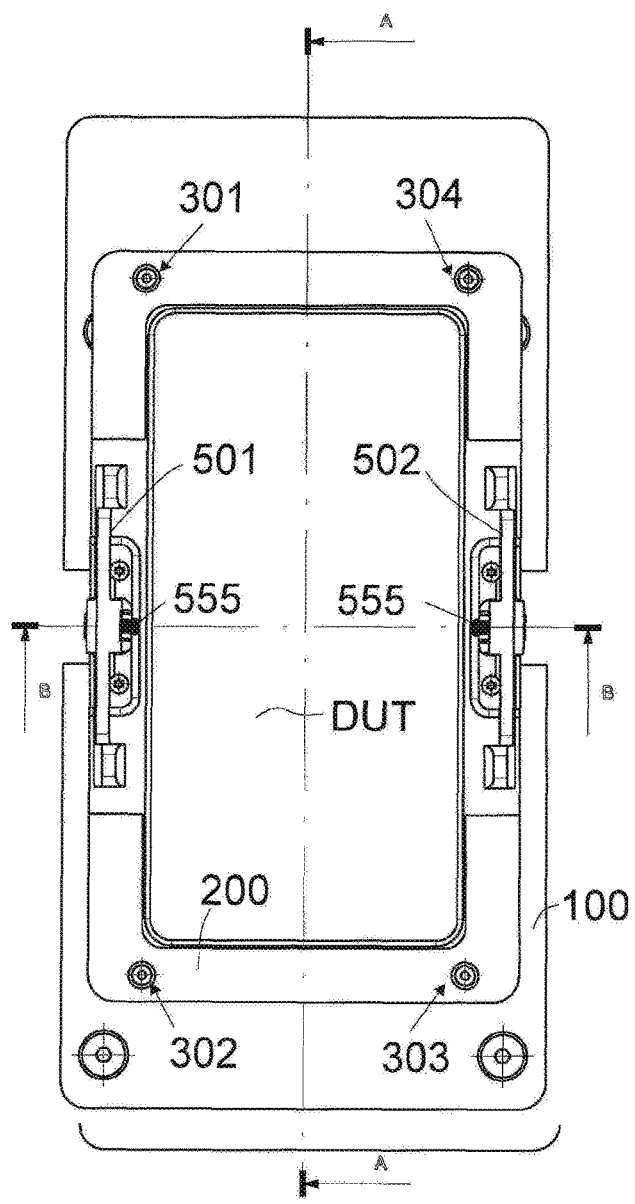
FIG. 1 is a top view of a test adapter in its top position with a product.
Figure 2:
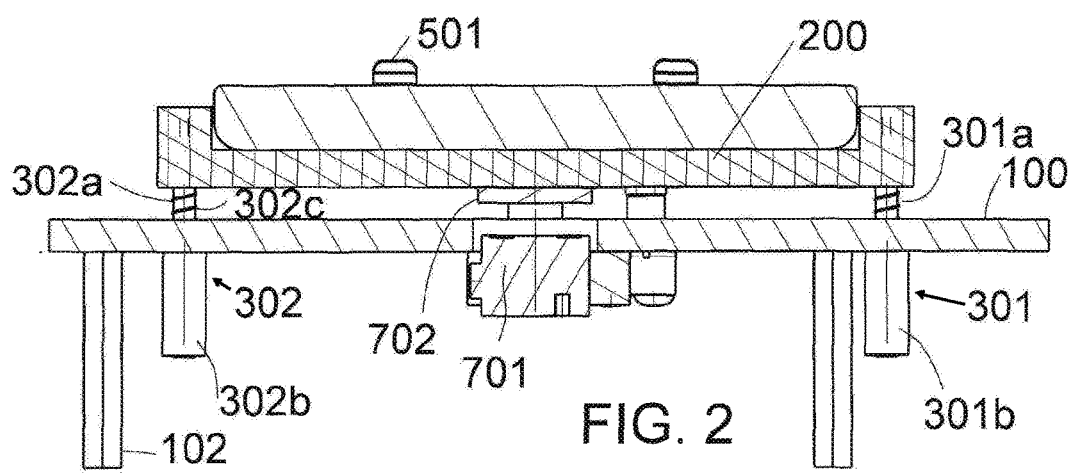
FIG. 2 shows a cross-section A-A of FIG. 1.
Figure 3:
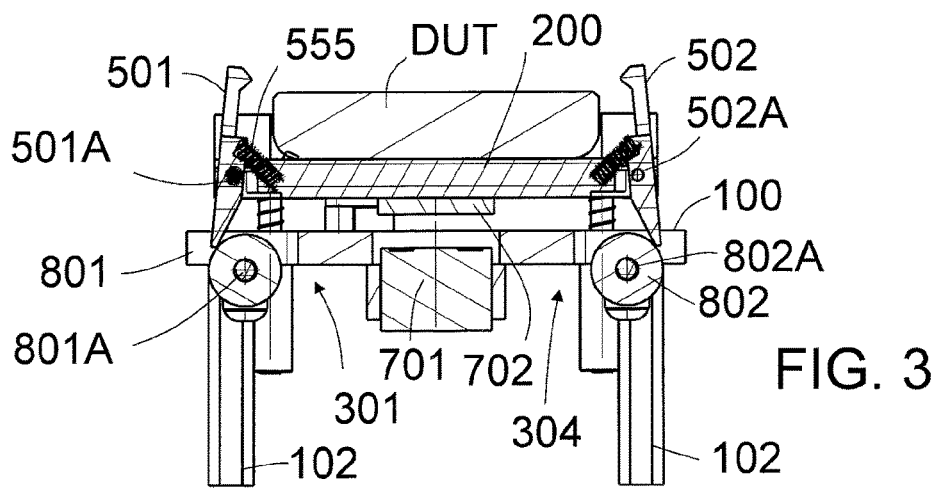
FIG. 3 shows a cross-section B-B of FIG. 1.
Figure 4:
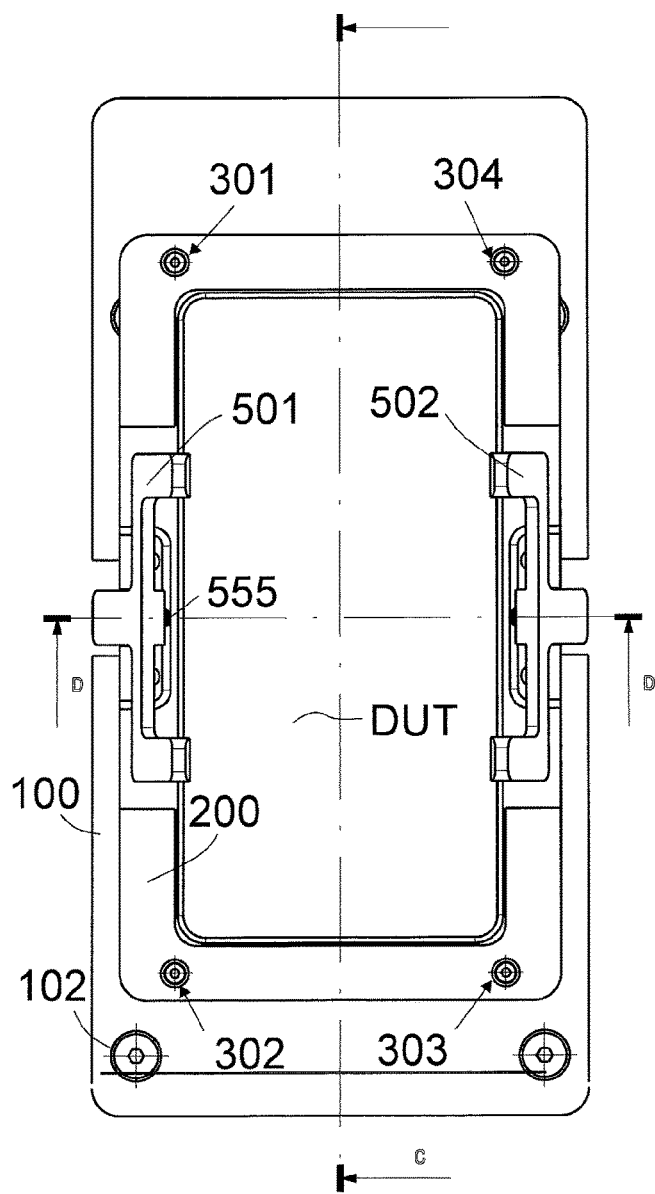
FIG. 4 is a top view of a test adapter in its down-pressed position with a product.
Figure 5:
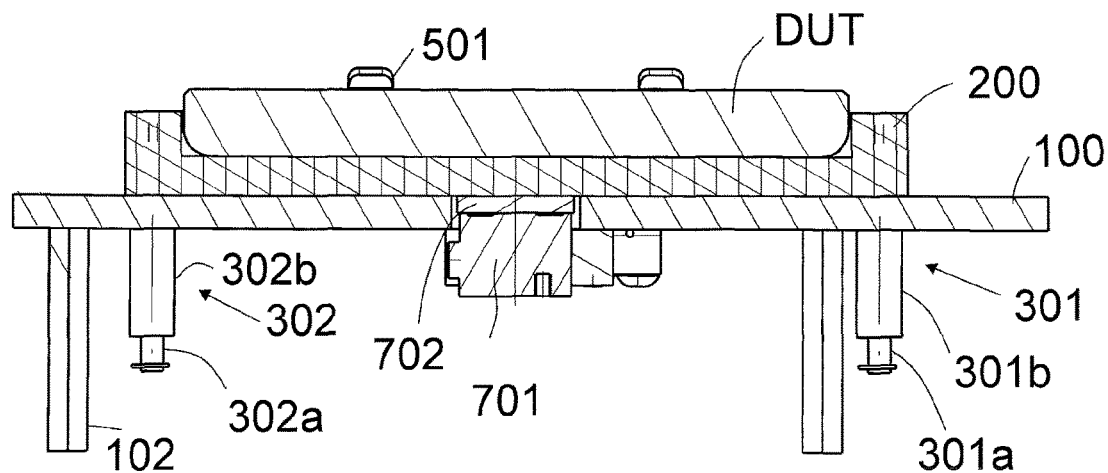
FIG. 5 shows a cross-section C-C of FIG. 4.
Figure 6:
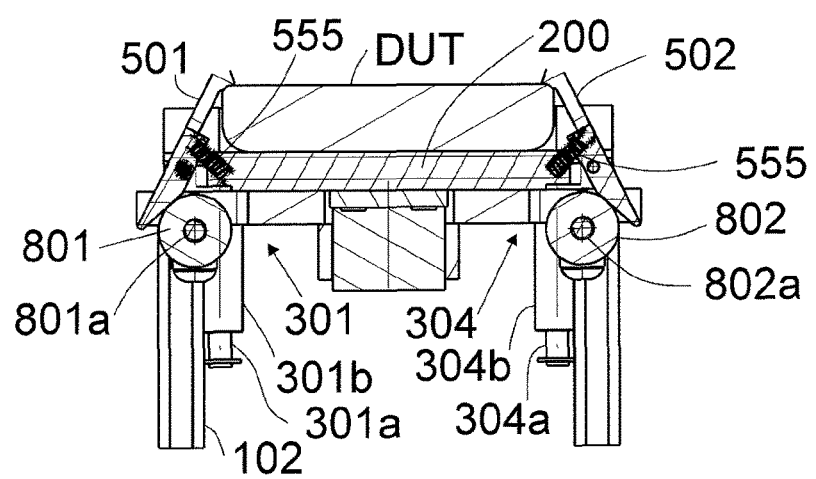
FIG. 6 shows a cross-section D-D of FIG. 4.
Figure 7:
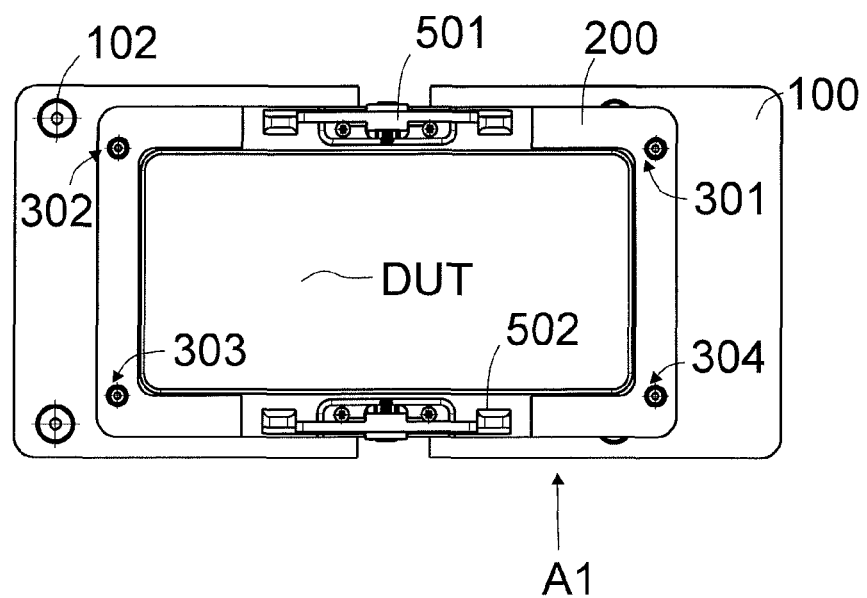
FIG. 7 is a top view of a test adapter with a product in its top position, i.e. before it is pressed down.
Figure 8:
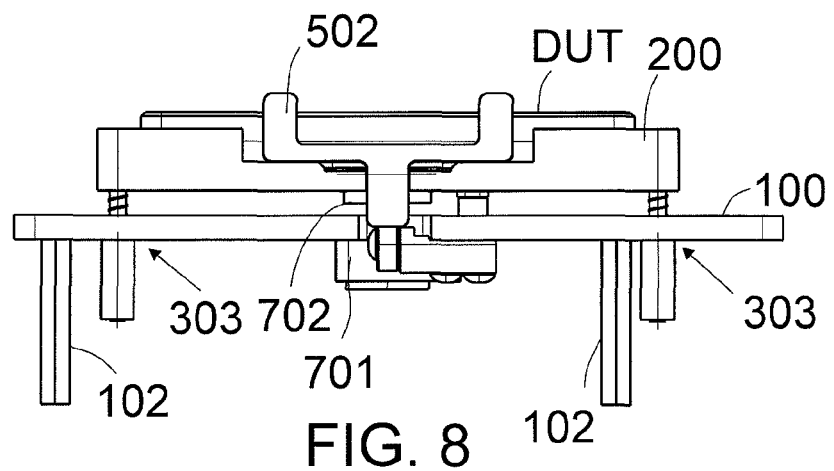
FIG. 8 is a side view of the test adapter with a product as seen from the direction of arrow A1 in FIG. 7.
Figure 9:
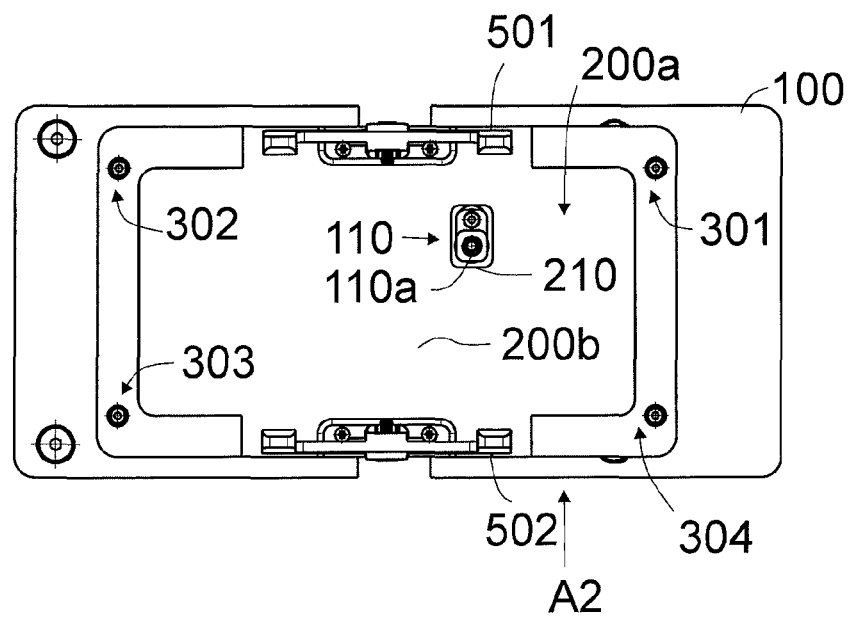
FIG. 9 is a top view of a test adapter without a product in its top position, i.e. before it is pressed down.
Figure 10:
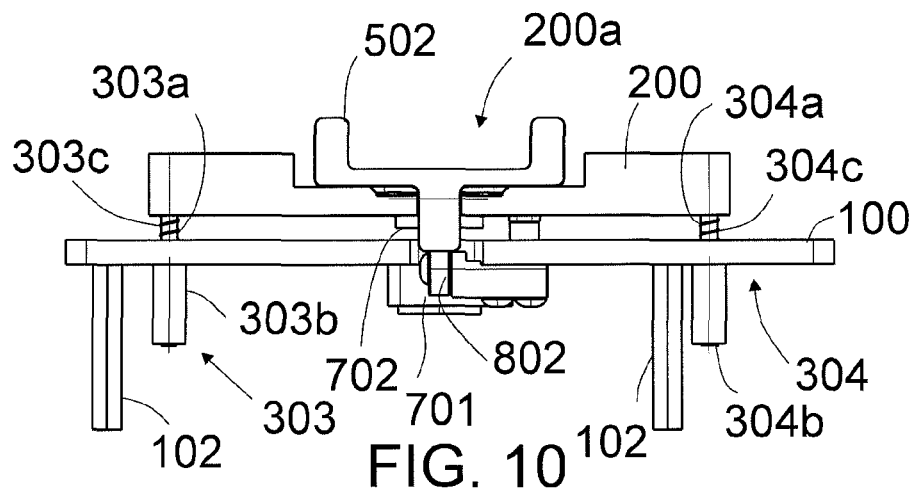
FIG. 10 is a side view of a test adapter without a product as seen from the direction of arrow A2 in FIG. 9.
Figure 11:
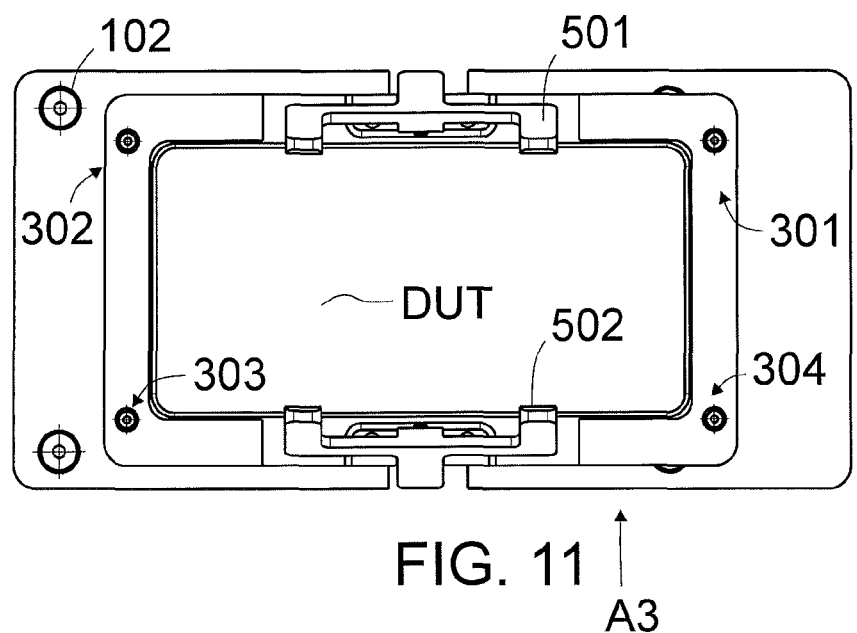
FIG. 11 shows the situation according to FIG. 7 after pressing down.
Figure 12:
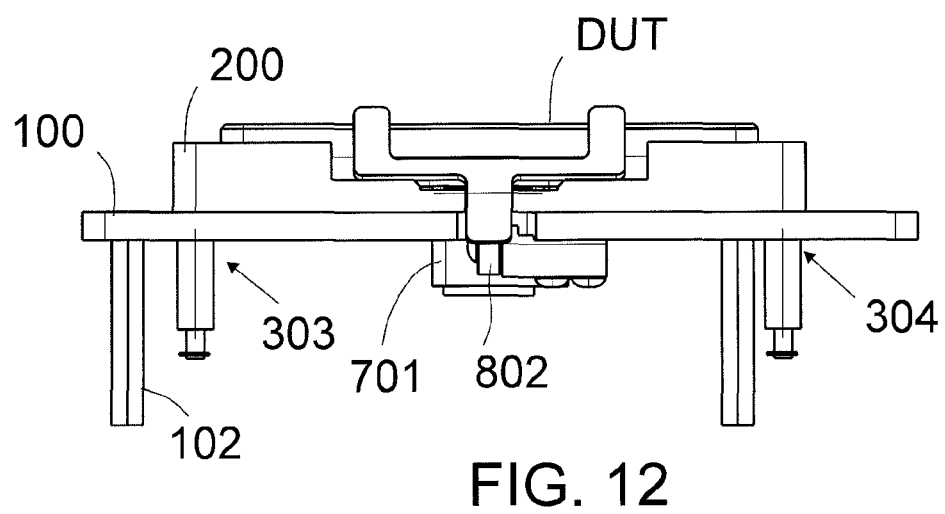
FIG. 12 shows the situation according to FIG. 8 after pressing down and, at the same time, the situation according to FIG. 11 as seen from the direction of arrow A3 in FIG. 11.
Figure 13:
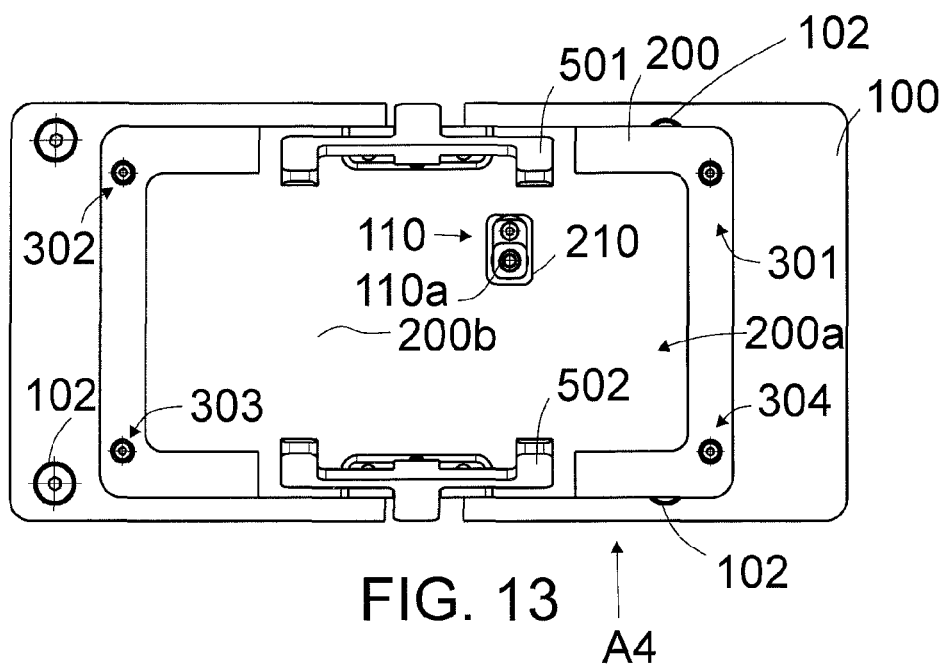
FIG. 13 shows the situation according to FIG. 9 after pressing down.
Figure 14:
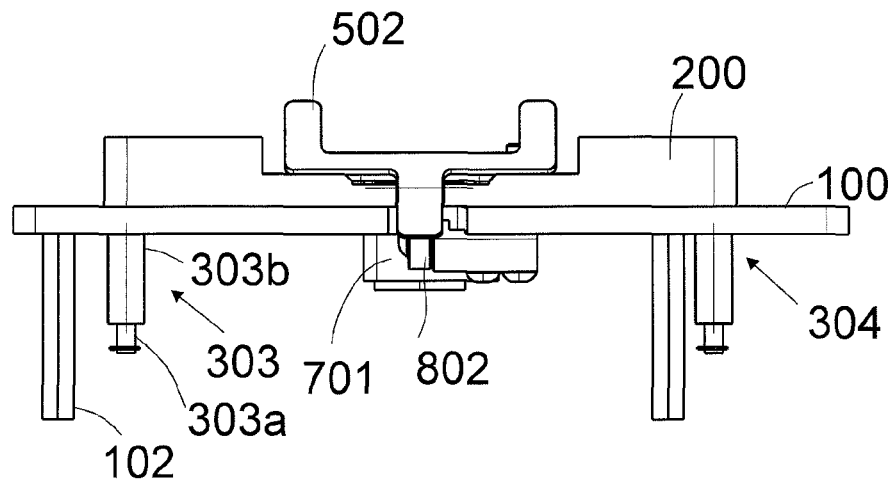
FIG. 14 shows the situation according to FIG. 10 after pressing down and, at the same time, the situation according to FIG. 13 from the direction of arrow A4 in FIG. 13, FIGS. 15 to 17 show a test adapter in different steps, without a product, with a product, and with a product locked in place.
Figure 15:
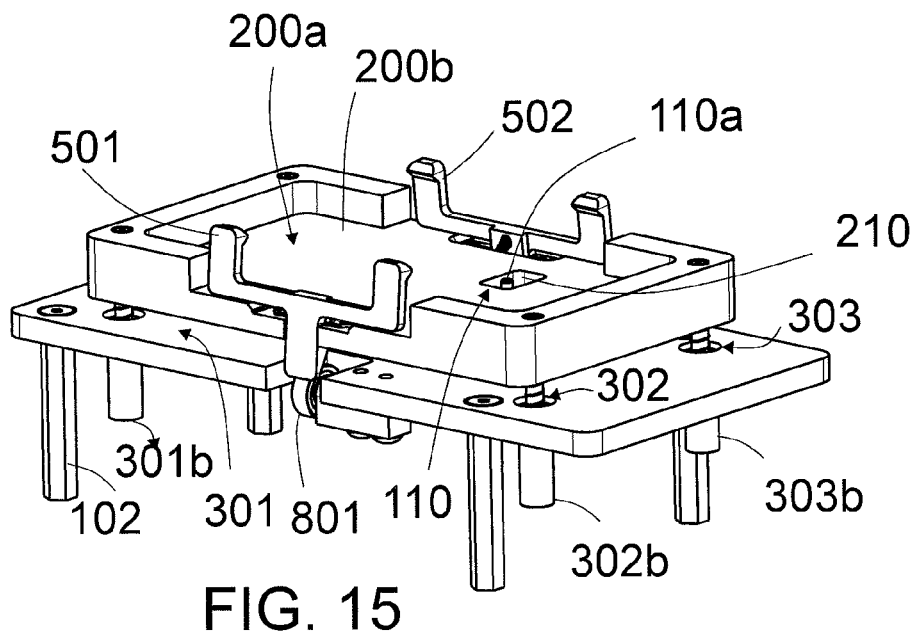
Figure 16:
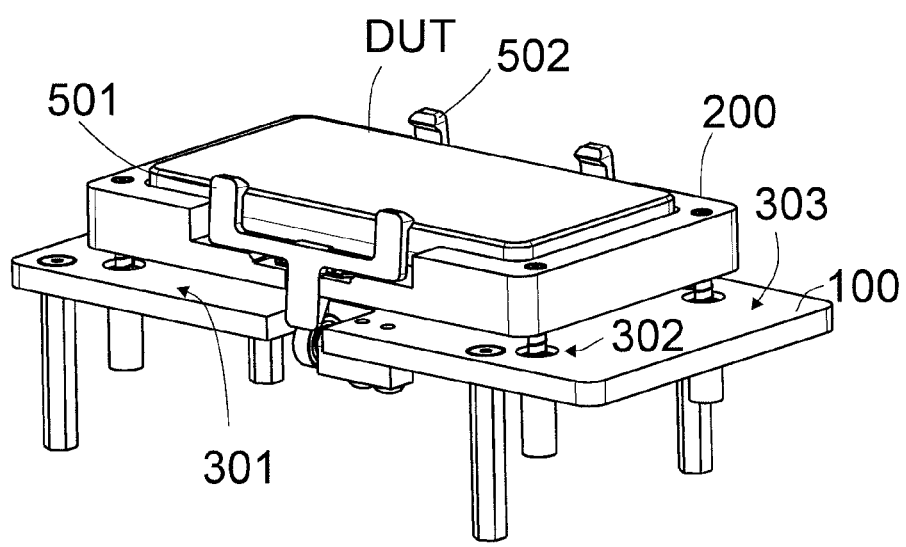
Figure 17:
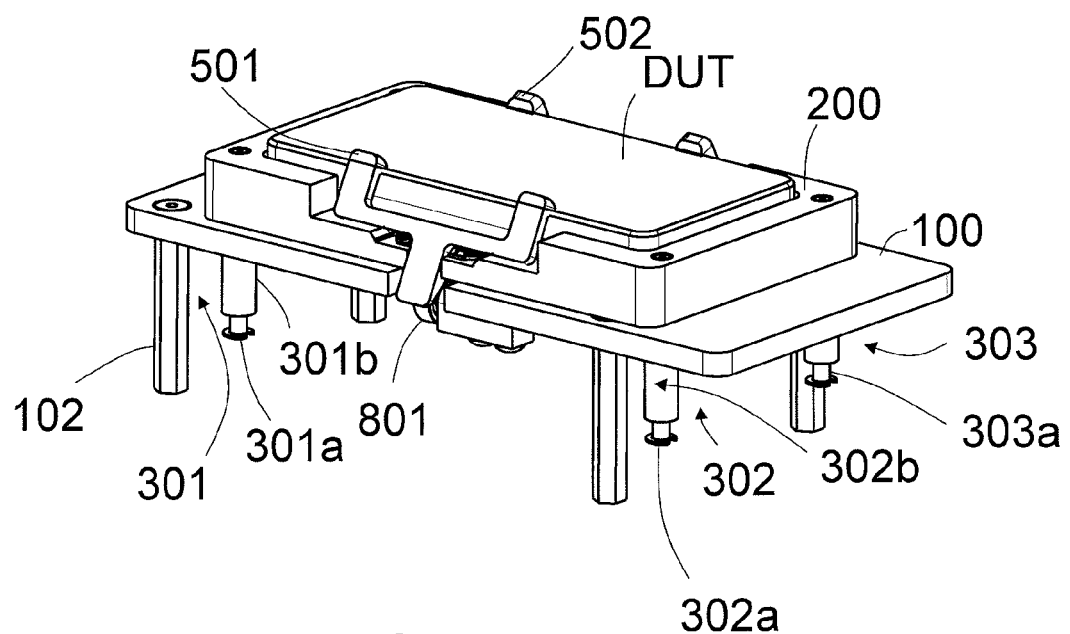
Figure 18:
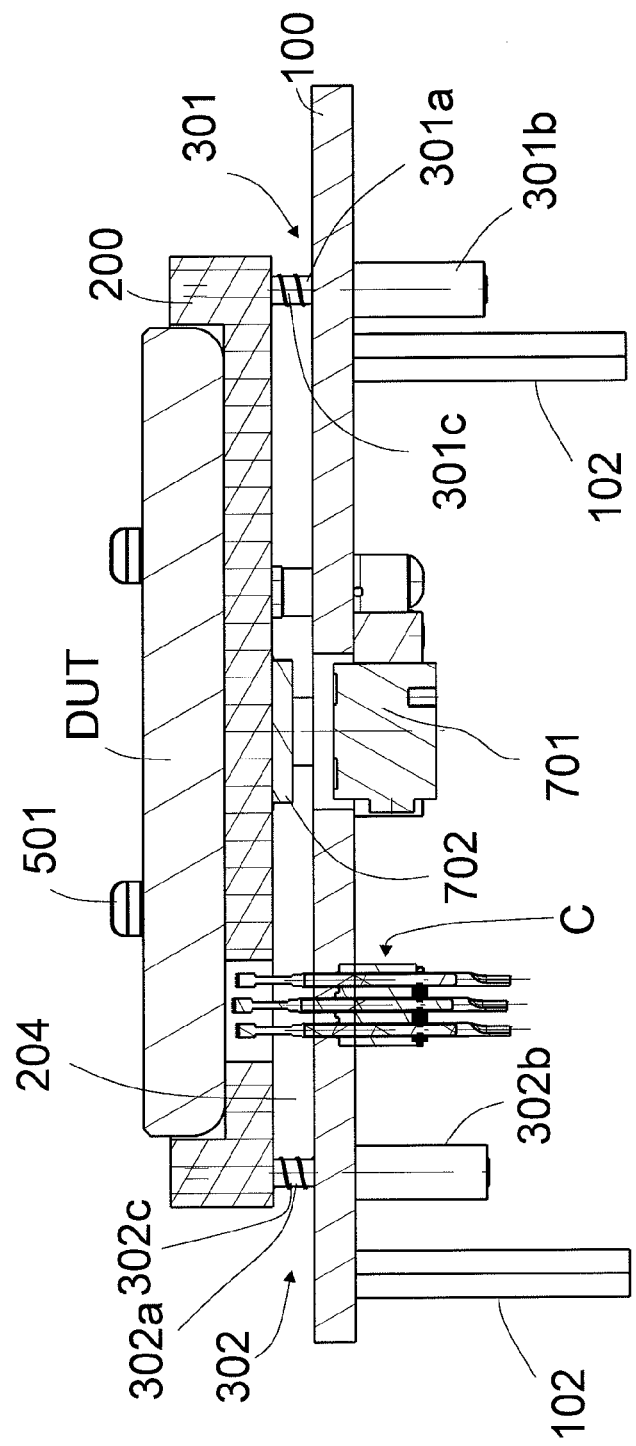
FIG. 18 shows a test adapter as depicted in FIG. 3 with a contact structure, such as pins, for establishing a test contact with the product.

The test adapter comprises a support structure 100 and a product stand 200 supported on the support structure 100 for the product DUT. With reference to FIG. 18, the adapter TA also comprises one or more contact structures C, such as a connector or some other contact structure, for establishing a test contact to the product DUT. Establishing a test contact to the product DUT may alternatively take place through an USB connection.

The support structure is a planar piece and made of aluminium, for example.

The support structure 100, in turn, is on bottom supports 102, such as support feet 102, and the bottom supports 102, in turn, may be on an operational unit (not shown) that may be a circuit board with a desired component configuration with electronic components as well as connection ports to an external testing system or power source, for instance.

The product stand 200 is supported to the support structure 100 by a guide structure 301 to 304 that controls the vertical movement U of the product stand.

The vertical movement U of the product stand 100 and the product DUT thereon can be seen when comparing the top position and low position of the product stand 200 with each other. FIGS. 1 to 3, 7 to 10 and 16 to 17 show the top position. FIGS. 4 to 6, 11 to 14 and 17 show the low position.

In an embodiment, the guide structure is distributed and comprises several guide structure elements 301 to 304. The guide structure elements are from their upper sides fastened to the corners or other edge areas of the product stand 200.

In an embodiment the guide structure comprises a spring structure 301c, 302c, 303c or some other returning structure for returning the product stand 300 to its top position. The guide structure elements 301 to 304 have their own returning structures, of which springs 301c, 302c, 303c and 304c are shown in FIGS. 2 to 3, 8, 10, and 15 to 16.

Each guide structure element 301 to 304 has a first part, i.e. upper part, 301a, 302a, 303a, 304a in contact with the product stand 200, and a second part, i.e. lower part, 301b, 302b, 303b, 304b in contact with the support structure 100. In an embodiment, the first part 301a is nested with the second part 301b. With reference to FIGS. 12, 14, 15 to 16, for example, the nestedness means that the first part 301a, 302a, 303a, 304a, i.e. the part in contact with the product stand 200, is the inner part, and the second part 301b, 302b, 303b, 304b, i.e. the part in contact with the support structure, is the outer part.

The product stand 200 is arranged by a direct or indirect pressing movement from above to be movable from the top position TOP to the low position LOW supported by the guide structure 301 to 304. The test adapter TA comprises a retaining structure 701 to 702 for retaining the product stand 200 in its low position LOW and for retaining the latch structure 501 to 502 in the adapter in its locking position. The latch structure 501 to 502 is arranged to lock the product DUT to the product stand 200. The initiator of the pressing movement from above may be the worker using the test adapter TA, for instance the operator of the testing station. Pressing may also be directed to the product stand 200 indirectly, i.e. the operator may press the top surface of the product DUT. For instance, in the start situation according to FIG. 15, the operator first sets DUT in place on the product stand 200 that is in its top position TOP, then in the situation according to FIG. 16, the operator presses the top surface of DUT by hand, which results in the situation according to FIG. 17, i.e. the low position LOW. The latch structure 501 to 502 has turned to be on the product DUT and the retaining structure 701, 702, which may be electromagnetic, keeps the product stand 200 in the low position.

The latch structure 501 is at the product stand 200 and arranged to receive its command to move to its closed position (e.g. FIG. 17) from the movement of the product stand to the low position LOW. Correspondingly, the latch structure 501 to 502 is arranged to receive its command to move from its closed position (e.g. FIG. 17) from the movement of the product stand to the top position TOP. The latch structure comprises a returning device 555, such as a spring, that ensures that the latch structure 501, 502 remains in contact with a guide roll 801, 802 and also ensures that the latches 501, 502 open, i.e. their top parts turn away from the product DUT.

In an embodiment, the latch structure 501 to 502 is fastened by an axle or some other rotating fastening 501a, 502a to the edge of the product stand 200 product space 200a. The latch structure 501 to 502 is two-sided and comprises a first latch 501 on one edge of the product space 200a of the product stand 200 and a second latch 502 on the opposite edge of the second product space 200a of the product stand 200.

In an embodiment, the support structure 100 has a guide roll 801 to 802 or some other guide that is arranged to guide the latch structure on the product stand to its locking position. This guide roll 801, 802 or the like that is at the support structure and intended for the latch structure 501, 502 on the product stand 200 is fastened by an axle 801a, 802a (FIGS. 3 and 6) or some other rotating fastening 801a, 802a to the support structure 100. The guide roll 801, 802 may be a small bearing.

The direction of the swing axis of the rotating fastening 501a, 502a of the latch structure 501, 502 and the rotating direction of the rotating fastening of the guide directing the latch structure 501, 502 to rotate are essentially parallel.

The following discusses the retaining structure 701, 702, with which the product stand 200 with its product DUT are kept in the low position shown in FIGS. 4 to 6, 11 to 14 and 17. In an embodiment, the retaining structure is magnetic with an electric control to activate and deactivate the magnetic attachment. In an embodiment, the first part 701 of the magnetic retaining structure is then an electromagnet and the second part of the magnetic retaining structure is a ferromagnetic piece 702. With the electromagnet 701 and its control, it is easy to activate both the low position and the release upward.

With reference to what is stated above, the electric control of the magnetic retaining structure thus comprises at the support structure 100 a switch 110, the switch part 110a of which extends to the vicinity of the product stand 200 product space 200a bottom 200b in a channel that penetrates the product stand 200 product space 200a bottom. The switch part 110a, such as a push button, is arranged to activate the magnetic attachment when the product stand is in its low position. This results from the fact that at the end of the pressing down movement of the product stand 200, the bottom of the product DUT presses the switch part 110a downward and activates the electromagnet 701, whereby the electromagnet 701 and its counter-piece 702 at the bottom of the product stand 200 attach to each other. The switch 110, 110a is arranged to activate the electromagnet.

In addition, there may be a separate switch 150, with which the electromagnet 701 is deactivated, in which case the springs 301c, 302c, 303c and the spring of the fourth guide structure element can lift the product stand 200 with the product DUT to the top position and, at the same time, the latch structure 501, 502 opens and makes it possible to remove the product DUT from the product stand 200.

The magnetic retaining structure comprises a first part 701 that is at the support structure 100, and a second part 702 that is at the product stand 200. When the product stand 200 is in its low position (FIGS. 4 to 6, 11 to 14 and 17), the first part 701 and second part 702 of the magnetic retaining structure are in contact with each other as in the figures or at least remain in place close to each other under the magnetic force.

FIGS. 2 to 3, 5 to 6 and 10 to 12, among others, show that the first part 701 of the magnetic retaining structure is fastened below the support structure and extends at least partly through the support structure 100. Correspondingly, the second part 702 of the magnetic retaining structure is on the bottom surface side of the product stand. It can be seen that the first part 701 and the second part 702 of the magnetic retaining structure are essentially aligned. The top surface of the first part, or electromagnet, 701 may be level with the top surface of the support structure 100, below it or above it; in the figures, it is below the top surface of the support structure.

The second part 702, or upper part 702, of the magnetic retaining structure is in the area of the centre point of the product stand 200 so as to achieve a symmetrically even attachment.

One or more test contact structures C of the test adapter extend through the opening 204 in the product stand 200 to a location where connecting with the product DUT is possible.

Individual features of different embodiments may also be combined to make other embodiments possible.

It will be apparent to a person skilled in the art that as technology advances, the basic idea of the invention may be implemented in many different ways. The invention and its embodiments are thus not restricted to the examples described above but may vary within the scope of the claims.

What is claimed is:

1. A test adapter for an electronic product to be tested, the test adapter comprising:
   a support structure;
   a product stand supported on the support structure and configured to receive and retain the product within a product space of the product stand the product stand being supported to the support structure by a guide structure that controls the vertical movement of the product stand, the product stand being, by a direct or indirect pressing movement from above, arranged to be movable from a top position to a low position on the guide structure; and
   a retaining structure comprising a first part at the support structure and a second part at the product stand, the retaining structure retaining the product stand in the low position and for retaining a latch structure in the adapter in a locking position, the latch structure being arranged to lock the product to the product stand, the latch structure being at the product stand and arranged to receive a command to move to a closed position from the movement of the product stand to the low position, and to receive the command to move from the closed position from the movement of the product stand to the top position.

2. The test adapter as claimed in claim 1, wherein the latch structure is fastened by an axle or some other rotating fastening to the edge of the product stand product space.

3. The test adapter as claimed in claim 2, wherein the direction of the swing axis of the rotating fastening of the latch structure and the rotating direction of the rotating fastening of the guide that directs the latch structure to rotate are essentially parallel.

4. The test adapter as claimed in claim 1, wherein the latch structure is two-sided and comprises a first latch on one edge of the product space of the product stand and a second latch on the opposite edge of the second product space of the product stand.

5. The test adapter as claimed in claim 1, wherein the guide structure comprises a spring structure or some other returning structure for returning the product stand to the top position.

6. The test adapter as claimed in claim 1, wherein the guide structure is distributed and comprises several guide structure elements, and the guide structure elements are from their upper sides in contact with the corners or other edge areas of the product stand.

7. A test adapter for an electronic product to be tested, the test adapter comprising:
   a support structure;
   a product stand supported on the support structure and configured to receive and retain the product within a product space of the product stand the product stand being supported to the support structure by a guide structure that controls the vertical movement of the product stand, the product stand being, by a direct or indirect pressing movement from above, arranged to be movable from a top position to a low position on the guide structure; and
   a retaining structure comprising a first part at the support structure and a second part at the product stand, the retaining structure retaining the product stand in the low position and for retaining a latch structure in the adapter in a locking position, the latch structure being arranged to lock the product to the product stand, the retaining structure being magnetic with electric control to activate and deactivate the magnetic attachment.

8. The test adapter as claimed in claim 7, wherein, when the product stand is in the low position, the first part and second parts of the magnetic retaining structure are in contact with each other or at least close to each other under magnetic force.

9. The test adapter as claimed in claim 8, wherein the first part of the magnetic retaining structure is an electromagnet and the second part of the magnetic retaining structure is a ferromagnetic piece.

10. The test adapter as claimed in claim 8, wherein the first part of the magnetic retaining structure is fastened below the support structure and extends at least partly through the support structure, and the second part of the magnetic retaining structure is on the side of the bottom surface of the product stand.

11. The test adapter as claimed in claim 10, wherein the first part and the second part of the magnetic retaining structure are essentially aligned.

12. The test adapter as claimed in claim 8, wherein the second part of the magnetic retaining structure is in the area of the center point of the product stand.

13. The test adapter as claimed in claim 7, wherein the electric control of the magnetic retaining structure comprises at the support structure a switch, the switch part of which extends to the vicinity of the product stand product space bottom in a channel that penetrates the product stand product space bottom, the switch part being arranged to activate magnetic attachment when the product stand is in its low position.

14. A test adapter for an electronic product to be tested, the test adapter comprising:
   a support structure;
   a product stand supported on the support structure and configured to receive and retain the product within a product space of the product stand the product stand being supported to the support structure by a guide structure that controls the vertical movement of the product stand, the product stand being, by a direct or indirect pressing movement from above, arranged to be movable from a top position to a low position on the guide structure; and
   a retaining structure comprising a first part at the support structure and a second part at the product stand, the retaining structure retaining the product stand in the low position and for retaining a latch structure in the adapter in a locking position, the latch structure being arranged to lock the product to the product stand, the support structure having a guide roll or some other guide that is arranged to guide the latch structure on the product stand to the locking position.

15. The test adapter as claimed in claim 14, wherein the guide connected to the support structure and intended for the latch structure on the product stand is fastened by an axle or some other rotating fastening to the support structure.

16. A test adapter for an electronic product to be tested, the test adapter comprising:
   a support structure;
   a product stand supported on the support structure and configured to receive and retain the product within a product space of the product stand the product stand being supported to the support structure by a guide structure that controls the vertical movement of the product stand, the product stand being, by a direct or indirect pressing movement from above, arranged to be movable from a top position to a low position on the guide structure; and
   a retaining structure comprising a first part at the support structure and a second part at the product stand, the retaining structure retaining the product stand in the low position and for retaining a latch structure in the adapter in a locking position, the latch structure being arranged to lock the product to the product stand, wherein, in the low position of the product stand, one or more contact structures of the test adapter for establishing a test contact with the product extends through an opening in the product stand to a location where connecting with the product is possible.

* * * * *